United States Patent

Yoshida et al.

[11] 4,337,967
[45] Jul. 6, 1982

[54] STEERING DEVICE

[75] Inventors: Akio Yoshida, Toyota; Nobuyuki Inokuchi, Sakaemachi, both of Japan

[73] Assignee: Toyota Jidosha Kogyo Kabushiki Kaisha, Aichi, Japan

[21] Appl. No.: 156,323

[22] Filed: Jun. 4, 1980

[30] Foreign Application Priority Data

Jun. 25, 1979 [JP] Japan ................... 54-80441

[51] Int. Cl.$^3$ ............................................. B62D 1/18
[52] U.S. Cl. ...................................... 280/777; 74/493
[58] Field of Search ...................... 280/777, 731, 801; 188/1 C; 74/493

[56] References Cited

U.S. PATENT DOCUMENTS

| | | | |
|---|---|---|---|
| 2,639,626 | 5/1953 | Snyder | 74/493 |
| 3,435,700 | 4/1969 | Calhoun | 280/777 |
| 3,801,123 | 4/1974 | Jira | 280/777 |
| 3,923,319 | 12/1975 | Nonaka | 280/777 |
| 3,988,027 | 10/1976 | Serizawa | 280/777 |
| 4,019,403 | 4/1977 | Kondo | 188/1 C |
| 4,142,423 | 3/1979 | Ikawa | 188/1 C |
| 4,258,934 | 3/1981 | Tsuge | 188/1 C |

*Primary Examiner*—Richard A. Bertsch
*Assistant Examiner*—John A. Carroll
*Attorney, Agent, or Firm*—Koda and Androlia

[57] ABSTRACT

A steering device according to the present invention, wherein a steering shaft provided at the upper end thereof with a steering wheel is supported in a column tube fixed on a vehicle body, is of such an arrangement that: a cylindrical chamber is defined by a partition wall fixed on the inner surface of the column tube and through which the steering shaft extends and a piston fixed on a portion of the steering shaft downwardly of the partition wall, and a high pressure fluid generated by fluid pressure generating means for operating in a collision of the vehicle is filled in the cylindrical chamber, to thereby retract the steering shaft to a position of the lower end thereof.

8 Claims, 3 Drawing Figures

STEERING DEVICE

BACKGROUND OF THE INVENTION

1. Field of the Invention

The present invention relates to steering devices, and more particularly, to a steering device, in which a steering wheel is automatically retractable in a collision of a vehicle.

2. Description of the Prior Art

In order to secure the safety in a collision of a vehicle, the upper body of an occupant in a vehicle is restrained and held by a seatbelt in general. However, the head of such an occupant is not restrained, and hence, the head of the occupant, in a collision, is violently rotated about the root of the neck forward and downward, collides with a steering wheel, thus presenting the possibility of seriously hurting the throat or face.

Then, heretofore, there have been proposed techniques for preventing a steering wheel from protruding into a compartment in a collision of the vehicle, so that the head of the occupant may not collide with the steering wheel in the collision of the vehicle. However, in order to more or less prevent the occupant wearing the seatbelt as described above from being brought into contact with the steering wheel to receive an impact thereof, it is not satisfactory to only prevent the steering wheel from protruding into the compartment, and it is desirable that the steering wheel is positively retractable to a position, into which the head of the occupant does not collide in a collision of the vehicle.

SUMMARY OF THE INVENTION

This invention has been developed to obviate the abovedescribed problems of the prior art, and has as its object the provision of a steering device, in which the head of the occupant wearing the seatbelt does not collide with the steering wheel in a collision of the vehicle.

To accomplish this object, according to the present invention, a steering device, wherein a steering shaft provided at the upper end thereof with a steering wheel is supported in a column tube fixed on a vehicle body, is of such an arrangement that: a cylindrical chamber is defined by a partition wall fixed on the inner surface of the column tube and through which the steering shaft extends and a piston fixed on a portion of the steering shaft downwardly of the partition wall, and a high pressure fluid generated by fluid pressure generating means for operating in a collision of the vehicle is filled in the cylindrical chamber, to thereby retract the steering shaft to a position of the lower end thereof.

BRIEF DESCRIPTION OF THE DRAWINGS

The abovementioned features and object of the present invention will become more apparent with reference to the following description, taken in conjunction with the accompanying drawings, wherein like reference numerals denote like elements, and in which.

DETAILED DESCRIPTION OF THE INVENTION

Description will hereunder be given of the embodiments of the present invention with reference to the drawings.

Figure 1:
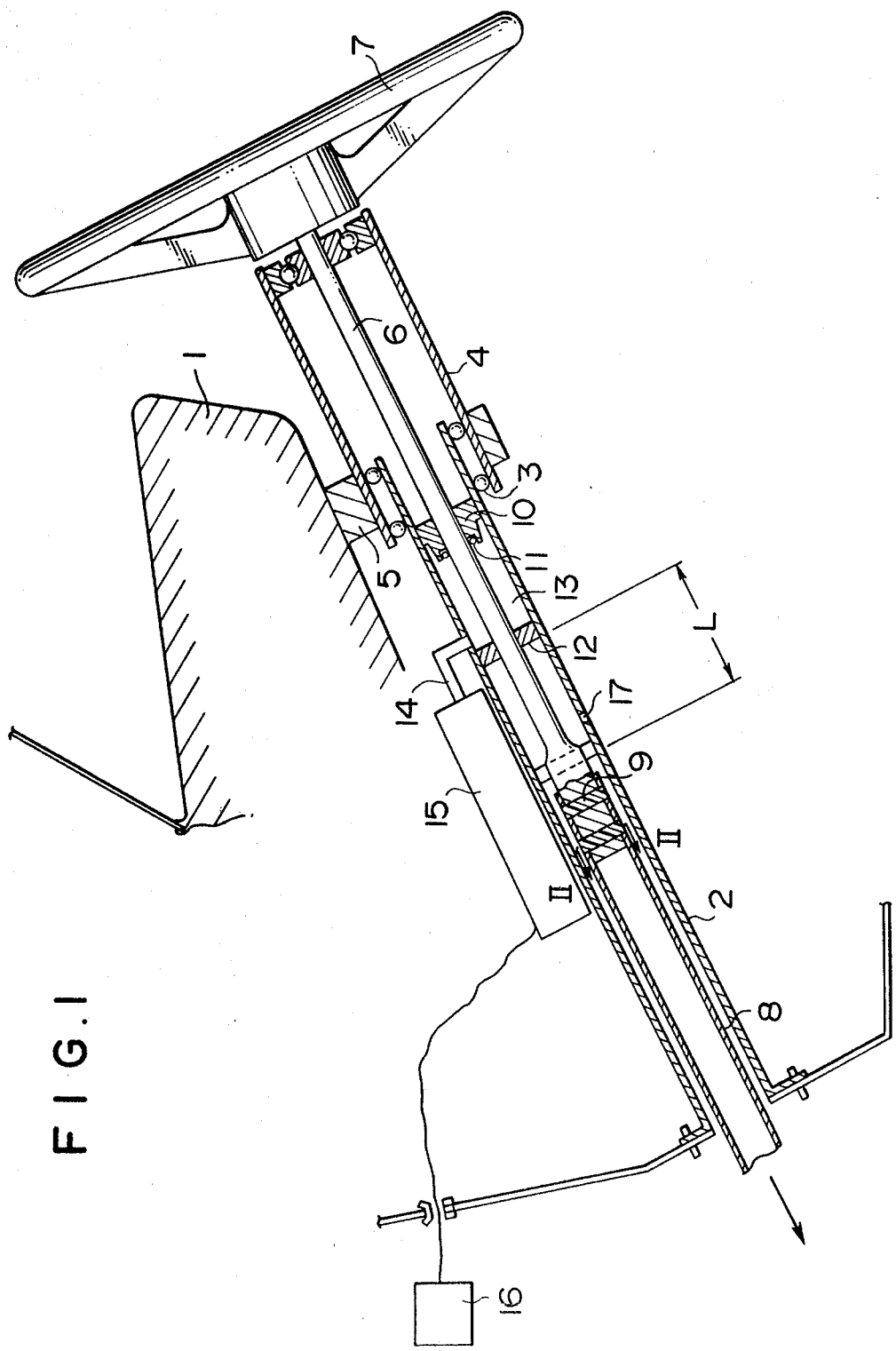
FIG. 1 is a sectional view showing a first embodiment of the steering device according to the present invention.
Figure 2:
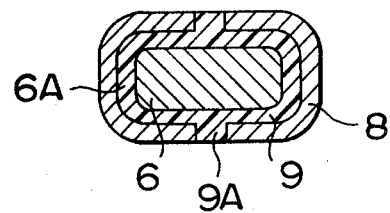
FIG. 2 is a sectional view taken along the line II—II in FIG. 1.

FIG. 1 is an explanatory view showing an embodiment of the present invention. The lower end portion of the column tube 2 is fixed on a toe board of a vehicle body 1. Coupled onto the upper end portion of the column tube 2 through steel balls 3 comparatively tightly inserted is an outer shaft 4, which is vertically, axially and slidably supported by a support portion 5 of the vehicle body 1. Extending along an axis portion of the column tube 2 and outer shaft 4 is an upper shaft 6, which is provided at the upper end thereof with a steering wheel 7. Furthermore, as shown in FIG. 2, formed at a position II at the lower end portion of the upper shaft 6 is a ring-shaped groove portion 6A, a plastics member 9 is cast-molded in a space defined between the ring-shaped groove portion 6A and a tubular lower shaft 8 inserted in a manner to enclose the ring-shaped groove portion 6A, and the upper and lower shafts 6 and 8 are integrally connected through a shear pin portion 9A of the plastics member 9. The lower end portion of the lower shaft 8 is connected to a steering gear box, not shown, and the upper shaft 6 is movable in the lower shaft 8 toward the lower end thereof by an axial load for destructing the shear pin portion 9A.

Fixed on the inner surface of the upper end portion of the column tube 2 is a partition wall 10, through the center of which an upper shaft 6 extends rotatably and axially, relatively movably through an O-ring 11. Fixed on a portion downwardly of the position, where the partition wall 10 is provided, is a disk-shaped piston 12, the outer peripheral surface of which is brought into contact with the inner surface of the column tube 2 in a manner to be movable relative thereto. More specifically, defined by the inner peripheral surface of the column tube 2, partition wall 10 and piston 12 is a cylindrical chamber 13, which is communicated with a high pressure gas generator 15 such as a high pressure gas cylinder or fire powder type gas generator through a high pressure pipe 14. The high pressure gas generator 15 is adapted to generate a high pressure gas in response to an output signal from a collision sensor 16 for sensing a collision of the vehicle.

Description will hereunder be given of operation of the embodiment as described above. In response to a collision signal fed from the collision sensor 16 due to a collision of the vehicle, the high pressure gas generator 15 operates, whereby a high pressure gas is poured into the cylindrical chamber 13 in the column tube 2 through the high pressure pipe 14 within a few tens of milliseconds upon the emission of the collision signal. This high pressure gas acts as a force to move the piston 12 toward the steering gear box, i.e., the bottom end because the partition wall 10 is fixed on the inner surface of the column tube 2 and the O-ring 11 is inserted into a gap between the upper shaft 6 and the partition wall 10. The piston 12 is fixed on the upper shaft 6, whereby the force acting upon this piston 12 shears the shear pin portion 9A, so that the upper shaft 6 can be moved toward the lower end in the lower shaft 8. Then, the steering wheel 7 provided at the upper end portion of the upper shaft 6 is automatically retracted toward the lower end of the vehicle. Here, the column tube 2 is provided therein with an exhaust port 17, and, when the piston 12 moves downward past the position, where the exhaust port 17 is provided, the high pressure gas fed from the high pressure gas generator 15 is relieved to outside, whereby the downwardly directed force ceases to act upon the piston 12, thereby stopping the downward movements of the upper shaft 6 and steering wheel 7. Consequently, it is possible to suitably select a retracting stroke L of the upper shaft 6 and steering wheel 7 in accordance with the position of providing the exhaust port 17.

With the abovedescribed embodiment, the upper shaft 6 and steering wheel 7 are positively retractingly moved toward the lower end of the compartment of the vehicle almost at the same time as the collision sensor 16 senses a collision of the vehicle, so that the head of occupant can be automatically prevented from colliding with the steering wheel 7. In addition, in the abovedescribed embodiment, description has been given of the case the high pressure gas generator 15 is provided outside of the cylindrical chamber 13 in the column tube 2. However, the high pressure gas or fire powder may be incorporated in the cylindrical chamber 13 instead. Furthermore, in the abovedescribed embodiment, the retracting stroke of the steering wheel 7 is restricted by the provision of the exhaust port 17. However, a stopper, with which the column tube 2 engages the piston 12, may be provided to restrict the retracting stroke.

Figure 3:
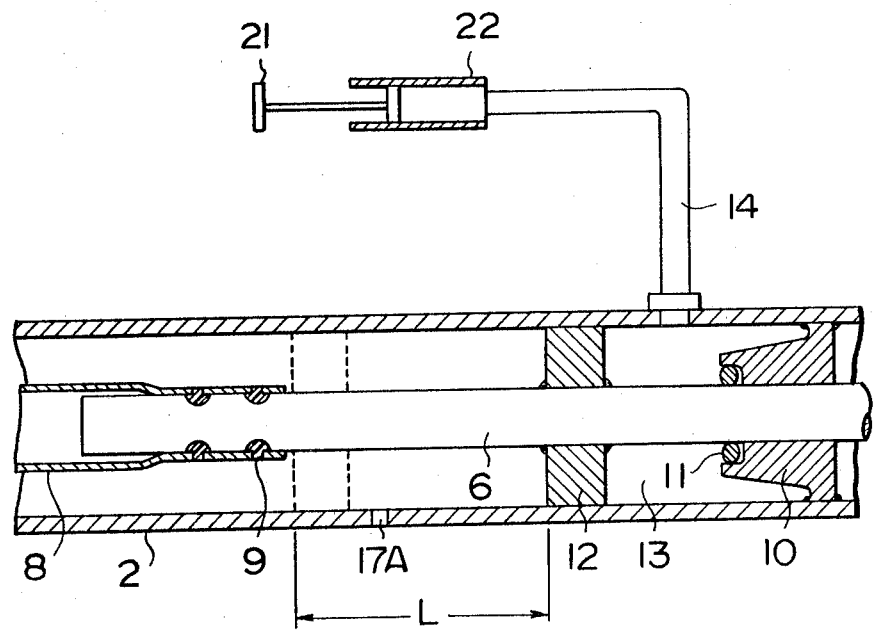
FIG. 3 is a sectional view showing to essential portions of another embodiment.

FIG. 3 is an explanatory view showing another embodiment of the steering device according to the present invention, in which like reference numerals as shown in the abovedescribed embodiment are used to designate like elements, so that detailed description thereof will be omitted. The difference of this embodiment from the abovedescribed embodiment is that, instead of the aforesaid collision sensor 16 and high pressure gas generator 15, a bumper 21 and a hydraulic pump 22 for operating when the bumper 21 does a stroke backward in the vehicle in a collision, and the hydraulic pump 22, high pressure pipe 14 and cylinder chamber 13 are constantly filled up with working oil.

More specifically, in a collision of the vehicle, the bumper 21 moves backward, whereby the hydraulic pump 22 secured to a support portion of the bumper 21 is operated, so that the working oil is poured into the cylinder bore 13 through the high pressure pipe 14. This working oil acts in the same manner as the high pressure gas in the abovedescribed embodiment so as to move the piston 12, upper shaft 16 and steering wheel 7 toward the lower end of the compartment of the vehicle by the predetermined retracting stroke L. Upon the completion of the travel of the piston 12 by the predetermined stroke, the working oil is relieved to outside through the oil discharge port 17A.

With this embodiment, in the same manner as in the preceding embodiment, at the same time as a collision of the vehicle, the steering wheel can be automatically retracted toward the lower end of the compartment of the vehicle to a position, where the head of the occupant does not easily collide with the steering wheel.

As has been described above, the steering device according to the present invention is of such an arrangement that: the cylindrical chamber is defined by the partition wall fixed on the inner surface of the column tube and through which the steering shaft extends and a piston fixed on the steering shaft downwardly of the partition wall, and the high pressure fluid generated by the fluid pressure generating means for operating in a collision of the vehicle is filled in the cylindrical chamber to retract the steering shaft to the position of the lower end thereof, and hence, can offer an advantage that the head of the occupant can be automatically prevented from colliding with the steering wheel.

It should be apparent to one skilled in the art that the abovedescribed embodiments are merely illustrative of but a few of the many possible specific embodiments of the present invention. Numerous and varied other arrangements can be readily devised by those skilled in the art without departing from the spirit and scope of the invention.

What is claimed is:

1. A retractable steering wheel assembly for a vehicle comprising:

a steering column assembly comprising a cylindrical tubular member having its lower end portion fixably mounted to a first portion of the body of said vehicle and its upper end portion supported by a second portion of said vehicle body;

a steering shaft assembly at least partially contained within and rotatably supported by said steering column assembly, said steering shaft assembly having a lower end extending below said lower end portion of said steering column tubular member for connection to a steering gear box, and having an upper end adapted for attachment to a steering wheel;

a steering wheel attached to said steering shaft assembly upper end;

a partition wall mounted in said upper end portion of said steering column assembly tubular member, said partition wall being provided with a central opening through which the said steering shaft assembly is inserted such that it may move rotatably and axially with respect to said steering column assembly;

a disc shaped piston fixed to an intermediate position of said steering shaft assembly inside said steering column tubular member and located downwardly from the position where said partition wall is located, said piston being of a dimension and shape such that its outer peripheral surface is in contact with and movable and rotatable relative to the inner surface of said steering column assembly tubular member, whereby said partition wall, said inner surface of said steering column assembly tubular member and said piston define a cylindrical chamber having an effective length which increases as said steering shaft assembly upper end is moved downwardly with respect to said steering column assembly;

pressure means for increasing the pressure within said cylindrical chamber, whereby said piston, said steering shaft assembly upper end and said steering wheel fixed thereto will all be positively retracted downwardly upon operation of said pressure means; and collision sensing means for causing said pressure means to operate in the event of a collision involving said vehicle.

2. The steering wheel assembly set forth in claim 1, wherein said steering shaft assembly comprises an upper shaft on which said steering wheel is fixed and a lower shaft to which said steering gear box is connected.

3. The steering wheel assembly set forth in claim 2, wherein a shearable plastics member is inserted into a gap between the lower end portion of said upper shaft and the upper end portion of said lower shaft.

4. The steering wheel assembly set forth in claim 2, wherein an outer housing is coupled onto the upper end portion of said steering column assembly tubular member by means of steel balls, and said outer housing rotatably supports the upper end portion of said upper shaft and is axially movably supported by the vehicle body.

5. The steering wheel assembly set forth in claim 2, wherein an O-ring for rotatably and axially movably supporting said upper shaft is provided inside said central opening of said partition wall.

6. The steering wheel assembly set forth in claim 1, wherein said pressure means is a high pressure gas generator for generating high pressure gas in response to an output signal fed from said collision sensing means.

7. The steering wheel assembly set forth in claim 2, wherein said pressure means and said collision sensing means comprise a bumper attached to said vehicle body and a hydraulic pump operable by the movement of said bumper relative to said vehicle body, said cylindrical chamber and any communicating passages therebetween are constantly filled with hydraulic fluid.

8. The steering wheel assembly set forth in claim 7, wherein said cylindrical chamber is provided therein with an oil discharge port for relieving the pressure of said hydraulic fluid at a predetermined position in the effective stroke of said piston.

* * * * *